United States Patent
Tran

(10) Patent No.: US 7,224,642 B1
(45) Date of Patent: May 29, 2007

(54) WIRELESS SENSOR DATA PROCESSING SYSTEMS

(76) Inventor: Bao Q. Tran, 6768 Meadow Vista Ct., San Jose, CA (US) 95135

( * ) Notice: Subject to any disclaimer, the term of this patent is extended or adjusted under 35 U.S.C. 154(b) by 0 days.

(21) Appl. No.: 11/340,733

(22) Filed: Jan. 26, 2006

(51) Int. Cl.
G01V 1/00 (2006.01)

(52) U.S. Cl. .................... 367/77; 702/14; 370/338

(58) Field of Classification Search ............ 367/77; 702/79, 14; 319/88.13; 455/456.6; 370/338
See application file for complete search history.

(56) References Cited

U.S. PATENT DOCUMENTS

| 4,623,991 | A  |   | 11/1986 | Vitringa |
|---|---|---|---|---|
| 5,581,514 | A  |   | 12/1996 | Moldoveanu et al. |
| 6,003,376 | A  |   | 12/1999 | Burns et al. |
| 6,078,283 | A  | * | 6/2000  | Bednar .................. 342/357.13 |
| 6,216,985 | B1 |   | 4/2001  | Stephens |
| 6,219,620 | B1 |   | 4/2001  | Park et al. |
| 6,226,601 | B1 | * | 5/2001  | Longaker .................... 702/79 |
| 6,315,740 | B1 |   | 11/2001 | Singh |
| 6,400,647 | B1 |   | 6/2002  | Huntress |
| 6,445,777 | B1 | * | 9/2002  | Clark ...................... 379/88.13 |
| 6,480,497 | B1 | * | 11/2002 | Flammer et al. ............ 370/400 |
| 6,532,190 | B2 |   | 3/2003  | Bachrach |
| 6,560,565 | B2 |   | 5/2003  | Roy et al. |
| 6,598,675 | B2 |   | 7/2003  | Bussear et al. |
| 6,679,332 | B2 |   | 1/2004  | Vinegar et al. |
| 6,798,716 | B1 |   | 9/2004  | Charych |
| 6,832,251 | B1 |   | 12/2004 | Gelvin et al. |
| 6,904,364 | B2 | * | 6/2005  | Randazzo et al. .......... 701/213 |
| 6,935,160 | B2 |   | 8/2005  | Hong et al. |
| 6,944,096 | B2 |   | 9/2005  | Lemenager et al. |
| 6,999,377 | B2 | * | 2/2006  | Burkholder et al. .......... 367/63 |
| 7,035,207 | B2 | * | 4/2006  | Winter et al. ............... 370/225 |
| 7,050,819 | B2 | * | 5/2006  | Schwengler et al. ..... 455/456.6 |
| 7,119,676 | B1 | * | 10/2006 | Silverstrim et al. ......... 340/531 |

OTHER PUBLICATIONS

Wikipedia, Wireless mesh network, Oct. 16, 2006, pp. 1-3.*

* cited by examiner

Primary Examiner—Mark Hellner
(74) Attorney, Agent, or Firm—Tran & Associates

(57) ABSTRACT

A wireless network includes a plurality of sensors; and a wireless station adapted to communicate with the plurality of sensors, each wireless station having a positioning system to provide 3D coordinates, each wireless station being part of a mesh network and each wireless station automatically determining the 3D coordinates of each sensor based on the mesh network.

20 Claims, 2 Drawing Sheets

WIRELESS SENSOR DATA PROCESSING SYSTEMS

BACKGROUND

This invention relates generally to wireless sensor networks.

Sensor networks are a means of gathering information about the physical world and then, after computations based upon these measurements, potentially influencing the physical world. An example includes sensors embedded in a control system for providing information to a processor. As noted in U.S. Pat. No. 6,832,251, the Wireless Integrated Network Sensor (WINS) development was initiated in 1993 under Defense Advanced Research Projects Agency (DARPA) program support. The Low-power Wireless Integrated Microsensors (LWIM) program pioneered the development of WINS and provided support for the development of fundamental low power microelectro-mechanical systems (MEMS) and low power electronics technology.

On a parallel note, oil and gas exploration includes the acquisition of formation characteristics by conducting seismic surveys. When seismic surveys are conducted on land, sensors are positioned in a survey area. Well-known techniques such as using vibrator trucks or explosives are employed to generate an acoustic wave. The acoustic wave travels through earth formations and is partially reflected at formation discontinuities. Various sensor types are used to sense the reflected wave as it returns to the surface. The sensor outputs a signal indicative of the wave, and a surface controller is then typically used to record the signal.

Conventional land-based seismic studies implant individual (analog) seismic sensors called geophones into the earth generally along a targeted seismic survey line. Each geophone generally has a case that may be buried or coupled to an earth spike for being driven into the earth by applying an inserting force to the top of the geophone case. Each geophone is generally deployed in a vertical orientation. Geophones having an earth spike are deployed into the earth with the earth spike downwardly disposed. Soil compaction (for buried geophones) or an inserting force (for geophones having an earth spike) are applied by a seismic technician in order to ensure favorable acoustic and seismic coupling of the geophone with the earth.

As described in U.S. Pat. No. 6,944,096, before deploying the geophone into the earth, the seismic technician estimates the desired position (with respect to geophysical requirements) for each geophone. Each geophone is positioned by stepping off a rough distance from an adjacent geophone(s) or by roughly positioning geophone(s) in a pattern about a survey peg or other benchmark placed in or near the center of the geophone group. Each geophone is generally electronically coupled to other geophones or to a seismic data recording units.

In conventional land-based seismic studies, geophones are strung in a predetermined pattern in a geophone array across the terrain of interest. A seismic source, such as an explosive charge, an air gun or vibroseis, is positioned within or adjacent to the geophysical spread defined by the array of geophones. Sound waves emanating from the energized seismic source into the earth are reflected and refracted back to the earth's surface by subsurface geological formations of interest. Sound waves returning to the surface are sensed by the deployed geophones that are electronically coupled to one or more seismic data recording units. Recorded sound waves, or seismic data, is processed and analyzed for use in determining formation content and properties.

As noted in U.S. Pat. No. 4,623,991, seismometers or geophones are devices which sense motion by suspending an inertial reference mass structure from a rigid, fixed supporting structure. A geophone is intended to sense motion from a direction which is roughly parallel to the axis of movement of the coil form with respect to the geophone housing. Therefore, it is desirable to eliminate or minimize the effects of any lateral motion of the coil form in response to forces which are not parallel to the axis of movement of the suspended coil form within the geophone. Typically, the mass is a coil form suspended by springs in a magnetic field, one spring being attached at each end of the coil form. The springs position the coil form within the magnetic field so that the coil form is centered laterally and along its axis within the magnetic field. The springs also form a suspension system having a predetermined resonant frequency.

In seismic operations, seismic waves are imparted into the earth's crust at or near the earth's surface, and portions of those seismic waves are reflected or refracted from the boundaries of subsurface layers. Geophones are arranged in arrays or groups on the earth's surface, and when the reflected or refracted waves encounter a geophone, the coil form, which is suspended between the two springs, tends to stand still while the geophone housing and its connected magnetic circuit moves with the earth's surface. The movement of the coil form through a magnetic field causes a voltage to be generated at the output of the geophone. The outputs of the arrays of geophones are recorded in a form which permits analysis. Skilled interpreters can discern from the analysis the shape of subsurface formations, and the likelihood of finding an accumulation of minerals, such as oil and gas. Conventional land-based seismic investigations require a large number of geophones, long lengths of seismic cables, and a crew of trained seismic technicians to position and deploy the geophone array for each stage of the seismic investigation.

SUMMARY

A wireless network includes a plurality of sensors; and a wireless station adapted to communicate with the plurality of sensors, each wireless station having a positioning system to provide 3D coordinates, each wireless station being part of a mesh network and each wireless station automatically determining the 3D coordinates of each sensor based on the mesh network.

Implementations of the above may include one or more of the following. The sensors can be MEMS sensors that outputs 24-bit or 32-bit seismic signals. The sensors can also be spring-mass sensors that use relative motion between a mass and a coil to generate an analog output signal (geophones). Some of the sensors can include wireless transmitter to transmit seismic data. A smart antenna or a multiple input multiple output (MIMO) antenna can be connected to the wireless transmitter to transmit seismic data. The wireless station or the sensor can use transmitters compatible with one of: 802 protocol, cellular protocol, Bluetooth protocol, Zigbee protocol, WiFi protocol, WiMAX protocol, 3G cellular protocol, or 4G cellular protocol. A WiMAX transceiver can receive transmission from the wireless stations to transmit seismic data to a remote location. A smart antenna or a multiple input multiple output (MIMO) antenna can be connected to the WiMAX transceiver. The WiMAX transceiver or other broadband transceiver can be mounted on a mobile platform or a truck to communicate with the wireless stations. Each wireless station can include a processor to remove noise from seismic data or perform pre-processing of the raw seismic data. A fuel cell can power the wireless station. The sensors communicate over the mesh network and self-assemble upon wireless station command. Time of arrival data can be used to determine sensor location.

Advantages of the system may include one or more of the following. The system minimizes the cost and limitation of conventional line and transverse cables. The system also eliminates costly cable maintenance and replacement. The system enables surveys to be conducted over old fields or congested urban areas where surface access is limited. Remote units are quickly set up, and if needed, repositioned without the need for extra cables. Data is transmitted in "real time" and monitored as it comes in to the central recording system. Acquisition of seismic data through the system can be accomplished in virtually all uncharted transition zones, rivers, lakes, swamps, inaccessible terrain, desserts and man-made barriers such as highways and cities. Minimal impact to the environment makes utilization of this system attractive.

The system also accurately and automatically determines the positions of geophones deployed in a geophysical spread. The system enables accurate position determining of sensor location in spite of human error, undulations in the terrain, and natural and man-made obstacles in the terrain and improves the accuracy of the seismic data, which determines the quality of the seismic analysis to best determine the locations of recoverable hydrocarbon deposits.

BRIEF DESCRIPTION OF THE DRAWINGS

So that the features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not be considered limiting of its scope, for the invention may admit to other equally effective embodiments. These drawings are not to scale, and the relative sizes of objects depicted therein may be exaggerated so that features and interrelationship of components may be better seen and understood.

DESCRIPTION

Figure 1:
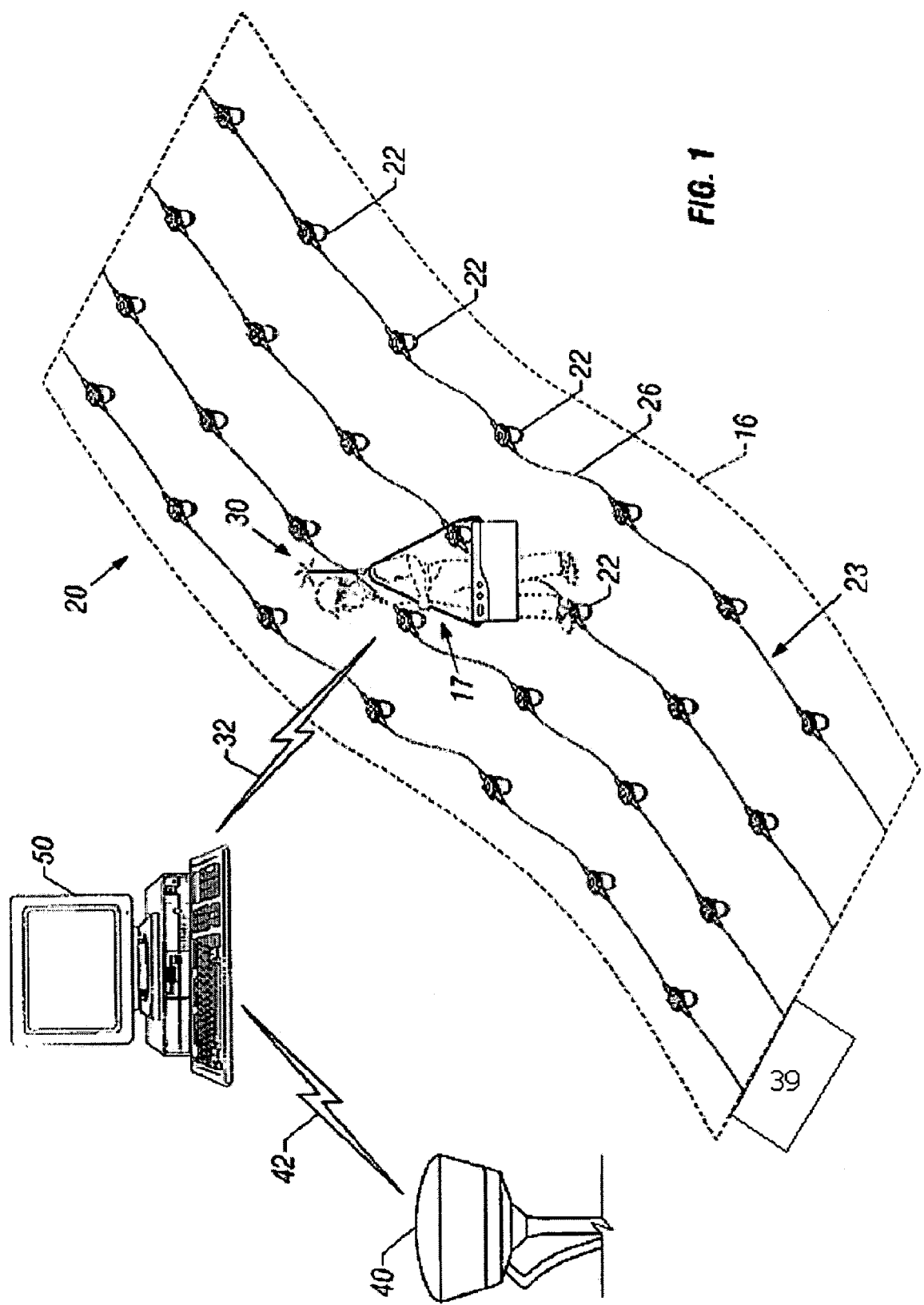
FIG. 1 is a schematic of a wireless seismic geophysical spread of terrain having multiple sensors disposed therein to facilitate a seismic investigation of subsurface geological formations.

FIG. 1 depicts a first embodiment of a seismic spread 20 of terrain having multiple sensors 22 disposed therein to facilitate a seismic investigation of subsurface geological formations lying beneath the terrain. The sensors 22 are generally linked one to others by cables 26, thereby forming seismic strings 23 having a series of sensors 22 cabled together in electronic communication. The seismic strings 23 in FIG. 1 are deployed in a generally parallel configuration to achieve the desired seismic coverage with generally uniform distribution and spacing of the sensors 22. The seismic strings 23 are deployed to cover the area of the seismic investigation, or the seismic spread 20. An operator 17 can inspect and or maintain the sensors 22 or place the sensor in its prior data collection position to repeat a prior seismic data collection process to compare changes in the geological formation, for example. The operator 17 can be instructed by a GPS or other suitable position sensors to move the sensor 22 into the exact prior position it was in to repeat the prior data collection process. The differences between the two data collection runs can be computed to determine changes in the geological formation.

In the embodiment of FIG. 1, cable 26 provides power to the sensor 22. For cabled sensors, cable 26 physically and electronically couples each sensor 22 to at least one adjacent sensor or geophone or, directly or indirectly, to a seismic data recorder in a wireless station. The data recorder can be 24-bit or 32-bit data converter that digitizes the outputs of the sensors. In this embodiment, a plurality of seismic strings 23 are connected to one or more wireless stations 39 that collects data from each sensor 22 and performs seismic data pre-processing such as stack processing, seismic data correlation, or other suitable data processing. Each wireless station 39 operates as a repeater for the data. The data is forwarded directly to the computer 50 or through a series of intermediate stations that can be wired or wireless. In one implementation, each wireless station 39 is a ruggedized personal computer with a digital signal processor board included therein to accelerate seismic processing, a positioning receiver such as differential GPS, and a wireless 802.X (802.11, WiFi, WiFi with MIMO, or WiMAX) transceiver to communicate with a remote computer 50 or nearby wireless stations or to a supervisor wireless station that consolidates the results of a plurality of wireless stations. The data is transferred using TCP/IP or other Internet protocols. The data can also be losslessly compressed or can be sent as raw data.

The function of navigational satellite receiver is well known in the art. The navigational satellite receiver generally uses triangulation to measure its distance from three or more orbiting satellites. The navigational satellite receiver measures its distance from a satellite by measuring the time required for a satellite signal originating from the satellite to reach the navigational satellite receiver and comparing that time to the amount of time required for a satellite signal to reach another navigational satellite receiver. By using multiple navigational satellite receivers, the comparison of the differences in the time required for satellite signals to be received from the navigational satellite improves positional measurement accuracy. Repeating this process using the signal from a second, third and perhaps additional satellites enables very accurate navigational satellite positioning. Signals originating from navigational satellites are either single or multi-band, and either or both of these bands may be used in determining positional measurements using navigational satellites. Corrections to navigational satellite measurements are generally necessary to correct for the influence of atmospheric conditions, electrostatic or electromagnetic interference or for errors in the broadcast satellite ephemeredes that may be present at the time of a measurement. The error correction may be obtained by subtracting or differencing the navigational satellite measurements obtained from the stationary and portable navigational satellite receivers.

Alternatively, the truck may carry a navigational satellite receiver. The positions of the truck, while it is stationary or in motion, are determined by either differencing the data with those from the stationary receiver or by removing the errors in the data directly with the computed corrections.

These positions, and the navigational satellite receiver data, collected are then combined with the satellite data from the portable receivers to estimate their locations. Correction of navigational satellite receiver data may include interpolation, smoothing and statistical processing including, but not limited to, averaging, weighted averaging or obtaining the standard deviation or mean of the data. The raw positional measurements obtained by the portable navigational satellite receiver at or near the time that the sensor 22 or 40 is deployed into the earth is processed in the computer 50 to provide a corrected geophysical location of the navigational satellite receiver.

The signal processor board handles multiple reflections being received from the same reflector, for example. Typically, those traces having common reflections are gathered into a common reflection gather, each trace of which has a different offset. Further processing of the traces within the common reflection gather is performed to eliminate error introduced by the different offsets (for example, NMO, and DMO, and other "migration" algorithms). The variety of processing done at this stage is quite large, and is well known to those of skill in the art. After this processing, the traces are added together (a.k.a. stacked), and the result is another trace. The first trace, representing the shot receiver pair, will be referred to herein as a "shot trace." The second trace, representing the stacked data, will be referred to herein as the "stacked trace." Stacking is performed for the purpose of elimination of noise, following the theory that noise is often random, or it can be made to appear random while signal is not random. Accordingly, reflections from seismic data should add constructively, while noise in the shot traces, when stacked, should add destructively. For a great deal of noise, such a process works quite well. However, noise that occurs in bursts, especially noise that occurs in patterns, is not, necessarily, eliminated through the stacking process of common reflection gathers.

In one embodiment, the wireless stations form a ruggedized WiFi network having redundant routes, frequency hopping, data encryption and packet-level integrity checks. The redundant routes enable the network to continually work around blockages such as interference, RF fading, unpredictable EMI. The network also can sidestep interferences using frequency hopping. Frequency hopping mitigates interference because a sensor 22 that transmits at one frequency (with or without interference) will use a different frequency for its next transmission. A sensor will hop to frequencies where it communicates successfully. The system also ensures the integrity of each transmitted packet using protocols that call for explicit acknowledgement from downstream sensors 40 to upstream sensors 40 to ensure succession packet reception. In yet other embodiments, encryption is used to ensure that payloads are secured, and sequence numbers and time stamped packets are used to eliminate duplicate packets that may have been transmitted across alternate paths in the network.

In one embodiment, the transceiver is connected to a smart antenna. The smart antenna includes a plurality of antennas such as 8 or 16 antennas. The transceiver determines the best antenna combination or configuration to be used for optimum transmission. In another embodiment, MIMO conforms to the 802.11n protocol and stands for multiple input, multiple output and refers to the use of more than one antenna to send and receive two or more unique data streams over the same channel simultaneously in wireless devices, resulting in networks with long ranges and high throughputs. In addition to multiple antennas, the MIMO transmission allows data sent from the wireless stations or from the sensors in multiple streams to be received and deciphered by clients. In combination, the multiple antennas and software allow data to be reliably sent and received in environments with considerable interference over relatively long distances. MIMO products create wireless networks that can reach significantly farther than current Wi-Fi networks and still provide high data throughputs. In some cases, wireless networks using MIMO technology can reach over 300 feet and still send and receive data at 30 mbps.

For completely wireless sensors 40 as well as the wireless stations, the power source may be any type of electrical power source, including a solar panel or any of several types of batteries known to those skilled in the art for powering portable electronic devices. Alternately, fuel cells can be adapted for consuming fuel, such as hydrogen, methanol or compressed natural gas, and for efficiently converting that fuel to electrical power to operate the components of the system.

Figure 2:
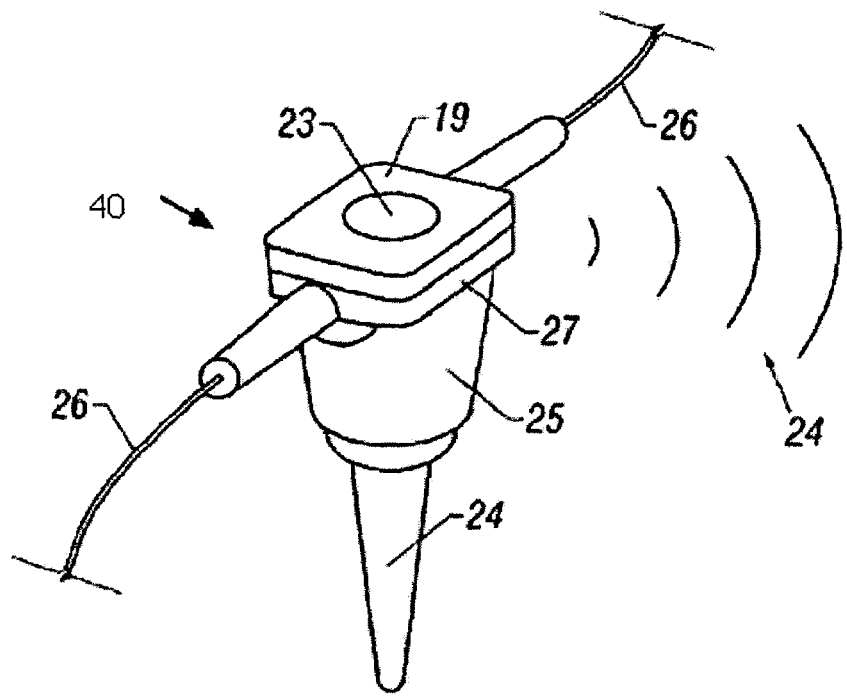
FIG. 2 shows an exemplary wireless sensor.
Figure 3:
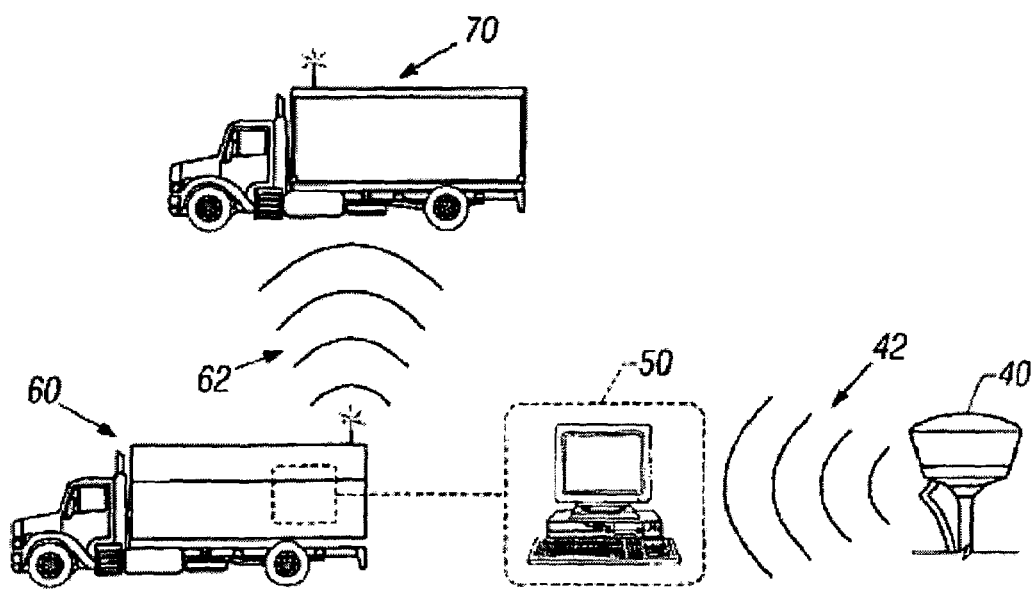
FIG. 3 shows an exemplary wireless network of seismic wireless sensors.

The wireless stations also receive data from wireless sensors 40. The sensors 22 or 40 may be designed to rest upon the ground, be buried in the ground or be driven into the ground using an earth spike. FIG. 2 depicts one embodiment of a wireless sensor 40 which can be a geophone or a suitable MEMS sensor for sensing acoustic or seismic waves during seismic investigations. The sensor has an earth spike 24 adapted for being forcefully driven into the earth. The sensor 40 of FIG. 2 comprises an earth spike 24 rigidly coupled to the sensor case 25.

The wireless sensor 40 can be a velocity sensor such as a geophone. A velocity sensor is a spring-mass sensor that uses relative motion between a mass and a coil to generate an analog output signal. An acoustic wave contacting the sensor causes the sensor housing to move. An internal mass suspended by a spring within the housing, tends to remain motionless as the housing moves relative to the internal mass. In a geophone, the internal mass is an electrically conductive coil having output leads and the housing contains an attached magnet. The relative motion of the magnet with respect to the coil produces a voltage output on the output leads. The resultant voltage produced is proportional to the velocity of the relative motion.

An alternative to the velocity-type geophone is an acceleration sensor called an accelerometer. Recent advances in accelerometer technology have resulted in the development of micro-electromechanical systems ("MEMS") based accelerometers. Another alternative includes piezoelectric hydrophones where arrays of hydrophones are used to detect seismic shock waves from the earth's substrata in response to induced shock waves at known locations on the earth. Hydrophones also are used in boreholes to conduct vertical seismic surveys and for a variety of other applications. Acoustic pressure variations across the hydrophone produce electrical signals representative of the acoustic pressure, which are processed for desired applications. Piezoelectric hydrophones typically contain a piezoelectric material as an active element which produces electrical signals when subjected to acoustic pressures.

A label 19 may be placed on the top surface 23 of the sensor 40. The label 19 may be used to visually or optically display the unique identification code for reading and recording by the seismic technician. A transmitter 23 of the sensor 40 communicates a unique identification code as well as captured data from the sensor 40 to a data receiver. The data transceiver 23 provides continuous or periodic communication of data received by the sensor 40 to a remote database such as the database on a computer. The transceiver 23 can transmit/receive satellite transmissions, cellular transmissions, and Worldwide Interoperability for Microwave Access (WiMAX) transmissions from a variety of service providers. The transceiver 23 can also support Zigbee, Bluetooth, Ultra-Wide Band (UWB) and 802.11X wireless local area network (WLAN) such as 802.11a/b/g. The radio device 23 co-exists with overlapping technologies that enable wireless high-speed communications. Wi-Fi, WiMAX, 3G (EV-DO, A, and B; HSDPA, for example) and UWB technologies each are necessary to form the global wireless infrastructure needed to deliver high-speed communications and Internet access worldwide. The Wi-Fi network can be coupled with wireless mesh networking and MIMO enhancements within 802.11n in one embodiment.

WiMAX is a standards-based broadband wireless access technology for enabling the last-mile delivery of information that provides fixed, nomadic, portable and, eventually, mobile wireless broadband connectivity without the need for direct line-of-sight connection between a base station and a subscriber station. In a typical cell radius deployment of 3 to 10 Km, WiMAX systems can support capacity of up to 40 Mbps per channel, for fixed and portable access applications. In a typical cell radius deployment of three to 10 kilometers, WiMAX systems can deliver capacity of up to 40 Mbps per channel, for fixed and portable access applications. WiMAX systems operate in licensed and license-exempt bands between 2–6 GHz RF spectrum, for example between 3.3 to 3.8 GHz and 5.7 to 5.8 GHz bands. These profiles cover both TDD and FDD systems. Other system profiles can address the 5.8 GHz license-exempt band, and the 2.5 and 3.5 GHz licensed bands.

One embodiment conforms to the IEEE 802.16e, the mobile Wireless Metropolitan Area Networks (WirelessMAN) standard that will facilitate the global development of mobile broadband wireless access (BWA) systems. The 802.16e system supports a combined fixed and mobile BWA supporting subscriber stations moving at vehicular speeds in licensed bands under 6 GHz. The transceiver 23 can also be of several types of transmitters that are known to those skilled in the art for transmitting data, including Bluetooth, Zigbee, 3G cell, 4G cell, or any other radio frequency or cellular technology.

Meshes of WiFi or WiMAX units can be combined to provide metropolitan area network as well as extending into a national area network. The WiFi or WiMAX Mesh Network topology is a semi-mobile system because the connectivity position among the sensors 40 may vary with time due to sensor 22 or 40 departures, new sensor 22 or 40 arrivals, and roaming nodes. The sensor 40 can send and receive messages so wireless data will find its way to its destination by passing through intermediate sensors 22 with reliable communication links. Thus data must "hop" through neighboring devices to reach its final destination. This multi-hoping capability is designed to create a robust meshed network that automatically routes congestion and line-of-sight obstacles, while improving throughput as subscriber density increases. In mobile communications, this method of multi-hopping is defined as a wireless ad hoc network.

Ad-hoc networks are defined as networks formed by users or devices wishing to communicate, without the necessity or existence of any previously infrastructure established between the potential network members. Ad-hoc communication can take place in different scenarios and is independent of any specific device, wireless transmission technology, network or protocol. Ad-hoc networks can significantly vary in size depending on application—the networks can contain two sensors or thousands of sensors exchanging data. Moreover, sensors 22 or 40 are free to enter or leave the network at any time.

Various routing protocols can be used. For example, the Temporally-Ordered Routing Algorithm (TORA) network routing protocol supports a network as a collection of routers (equipped with wireless receiver/transmitters) that are free to move about arbitrarily. The status of the communication links between the routers, at any given time, is a function of their positions, transmission power levels, antenna patterns, channel interference levels, etc. The mobility of the routers and the variability of other connectivity factors result in a network with a potentially rapid and unpredictably changing topology. Congested links are also an expected characteristic of such a network as wireless links inherently have significantly lower capacity than hardwired links and are therefore more prone to congestion. Another protocol is the Ad hoc On Demand Distance Vector (AODV) routing protocol. AODV is capable of both unicast and multicast routing. It is an on demand algorithm, meaning it builds routes between sensors 22 only as desired by source nodes. It maintains these routes as long as they are needed by the sources. Additionally, AODV forms trees that connect multicast group members. The trees are composed of the group members and the sensors 22 needed to connect the members. AODV uses sequence numbers to ensure the freshness of routes. It is loop-free, self-starting, and scales to large numbers of mobile nodes. Other routing protocols can be used. Also, in addition to WiMAX, Bluetooth, IEEE 802.11 and Ultra Wide Broadband (UWB) can also be used in ad-hoc networks.

One embodiment supports a multicluster-multihop network assembly to enable communication among every sensor 40 in a distribution of nodes. The algorithm should ensure total connectivity, given a network distribution that will allow total connectivity. One such algorithm of an embodiment is described in U.S. Pat. No. 6,832,251, the content of which is incorporated by referenced. The '251 algorithm runs on each sensor 40 independently. Consequently, the algorithm does not have global knowledge of network topology, only local knowledge of its immediate neighborhood. This makes it well suited to a wide variety of applications in which the topology may be time-varying, and the number of sensors 40 may be unknown. Initially, all sensors 40 consider themselves remotes on cluster zero. The assembly algorithm floods one packet (called an assembly packet) throughout the network. As the packet is flooded, each sensor 40 modifies it slightly to indicate what the next sensor 40 should do. The assembly packet tells a sensor 40 whether it is a base or a remote, and to what cluster it belongs. If a sensor 40 has seen an assembly packet before, it will ignore all further assembly packets.

The algorithm starts by selecting (manually or automatically) a start node. For example, this could be the first sensor 40 to wake up. This start sensor 40 becomes a base on cluster 1, and floods an assembly packet to all of its neighbors, telling them to be remotes on cluster 1. These remotes in turn tell all their neighbors to be bases on cluster 2. Only sensors 40 that have not seen an assembly packet before will respond to this request, so sensors 40 that already have decided what to be will not change their status. The packet continues on, oscillating back and forth between "become base/become remote", and increasing the cluster number each time. Since the packet is flooded to all neighbors at every step, it will reach every sensor 40 in the network. Because of the oscillating nature of the "become base/become remote" instructions, no two bases will be adjacent. The basic algorithm establishes a multi-cluster network with all gateways between clusters, but self-assembly time is proportional with the size of the network. Further, it includes only single hop clusters. Many generalizations are possible, however. If many sensors 40 can begin the network nucleation, all that is required to harmonize the clusters is a mechanism that recognizes precedence (e.g., time of nucleation, size of subnetwork), so that conflicts in boundary clusters are resolved. Multiple-hop clusters can be enabled by means of establishing new clusters from sensors 40 that are N hops distant from the master.

Having established a network in this fashion, the masters can be optimized either based on number of neighbors, or other criteria such as minimum energy per neighbor communication. Thus, the basic algorithm is at the heart of a number of variations that lead to a scalable multi-cluster network that establishes itself in time, and that is nearly independent of the number of nodes, with clusters arranged according to any of a wide range of optimality criteria. Network synchronism is established at the same time as the network connections, since the assembly packet(s) convey timing information outwards from connected nodes.

The position of each sensor 22 or 40 is also determined. One way to enable this is to equip every sensor 22 or 40 with a position location device such as GPS, or to manually inform the sensors 22 or 40 of their positions. However, for cost reasons this may not always be possible or desirable. An alternative is for a subset of the sensors to know their own positions, and then to distribute location knowledge by using communications with other sensors.

As the radios operate in the field, the radio frequency signals have negligible multipath delay spread (for timing purposes) over short distances. Hence, radio strength can be used as a basis for determining position. Alternatively, time of arrival can be used to determine position, or a combination of radio signal strength and time of arrival can be used. Position estimates can also be achieved in an embodiment by beamforming, a method that exchanges time-stamped raw data among the nodes. While the processing is relatively more costly, it yields processed data with a higher signal to noise ratio (SNR) for subsequent classification decisions, and enables estimates of angles of arrival for targets that are outside the convex hull of the participating sensors. Two such clusters of sensors 22 or 40 can then provide for triangulation of distant targets. Further, beamforming enables suppression of interfering sources, by placing nulls in the synthetic beam pattern in their directions. Another use of beamforming is in self-location of sensors 22 or 40 when the positions of only a very small number of sensors 22 or 40 are known such as those sensors nearest the wireless stations. The tracking and self-location problems are closely connected, and a predetermined number of sub-wireless stations can be used to provide auxiliary information to a target location operation. Thus, targets are used to provide the sounding impulses for sensor 22 location. A sparse clusters of sub-wireless stations with beamforming-capable sensors 22 or 40 can be overlaid on a dense network of geophones or MEMS devices, enabling control of the geophones or MEMS 22 or 40 for collection of coherent data for beamforming.

In one implementation where each sensor 22 knows the distances to its neighbors due to their positions in the line 23, and some small fraction of the sensors 22 (such as those nearest the wireless stations) of the network know their true locations. As part of the network-building procedure, estimates of the locations of the sensors 22 that lie within or near the convex hull of the sensors 22 with known position can be quickly generated. To start, the shortest distance (multi-hop) paths are determined between each reference sensor. All sensors 22 on this path are assigned a location that is the simple linear average of the two reference locations, as if the path were a straight line. A sensor 22 which lies on the intersection of two such paths is assigned the average of the two indicated locations. All sensors 22 that have been assigned locations now serve as references. The shortest paths among these new reference sensors 22 are computed, assigning locations to all intermediate sensors 22 as before, and continuing these iterations until no further sensors 22 get assigned locations. This will not assign initial position estimates to all sensors. The remainder can be assigned locations based on pairwise averages of distances to the nearest four original reference nodes. Some consistency checks on location can be made using trigonometry and one further reference sensor 22 to determine whether or not the sensor 22 likely lies within the convex hull of the original four reference sensors.

In two dimensions, if two sensors 22 have known locations, and the distances to a third sensor 22 are known from the two nodes, then trigonometry can be used to precisely determine the location of the third node. Distances from another sensor 22 can resolve any ambiguity. Similarly, simple geometry produces precise calculations in three dimensions given four reference nodes. But since the references may also have uncertainty, an alternative procedure is to perform a series of iterations where successive trigonometric calculations result only in a delta of movement in the position of the node. This process can determine locations of sensors 22 outside the convex hull of the reference sensors. It is also amenable to averaging over the positions of all neighbors, since there will often be more neighbors than are strictly required to determine location. This will reduce the effects of distance measurement errors. Alternatively, the network can solve the complete set of equations of intersections of hyperbola as a least squares optimization problem.

In yet another embodiment, any or all of the sensor sensors 22 or 40 may include transducers for acoustic, infrared (IR), and radio frequency (RF) ranging. Therefore, the sensors 22 have heterogeneous capabilities for ranging. The heterogeneous capabilities further include different margins of ranging error. Furthermore, the ranging system re-used for sensing and communication functions. For example, wideband acoustic functionality is available for use in communicating, bistatic sensing, and ranging. Such heterogeneous capability of the sensors 40 can provide for ranging functionality in addition to communications functions. As one example, repeated use of the communications function improves position determination accuracy over time. Also, when the ranging and the timing are conducted together, they can be integrated in a self-organization protocol in order to reduce energy consumption. Moreover, information from several ranging sources is capable of being fused to provide improved accuracy and resistance to environmental variability. Each ranging means is exploited as a communication means, thereby providing improved robustness in the presence of noise and interference. Those skilled in the art will realize that there are many architectural possibilities, but allowing for heterogeneity from the outset is a component in many of the architectures.

The term "positional measurement," as that term is used herein, is not limited to longitude and latitude measurements, or to metes and bounds, but includes information in any form from which geophysical positions can be derived. These include, but are not limited to, the distance and direction from a known benchmark, measurements of the time required for certain signals to travel from a known source to the geophysical location where the signals may be electromagnetic or other forms, or measured in terms of phase, range, Doppler or other units. The inventions disclosed herein are applicable to use with the Global Positioning System (GPS), the Global Navigational Satellite System (GNSS), and with any network of navigational satellites generally using triangulation to determine a geophysical location of an earthbound object. The term "satellite signal," as used herein, includes any signal originating from a navigational satellite and electronically, optically or otherwise detectable at the earth's surface using instruments. The term "satellite measurement," as used herein, includes any determination of a geophysical location using satellite signals originating from navigational satellites.

While various embodiments of the present invention have been described above, it should be understood that they have been presented by way of example only, and not in limitation. For instance, although examples have been described involving WiMAX, WiFi, Bluetooth, Zigbee, WLAN, and UWB communications, other short-range and longer-range communications technologies are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A wireless network, comprising:
   a plurality of sensors; and
   a wireless station adapted to communicate with the plurality of sensors, each wireless station having a positioning system to provide 3D coordinates, each wireless station being part of a mesh network providing node to node communication and each wireless station automatically determining the 3D coordinates of each sensor based on the mesh network, wherein one of the sensors comprises a MEMS sensor that outputs 24-bit or 32-bit seismic signals.

2. A wireless network, comprising:
   a plurality of sensors; and
   a wireless station adapted to communicate with the plurality of sensors, each wireless station having a positioning system to provide 3D coordinates, each wireless station being part of a mesh network providing node to node communication and each wireless station automatically determining the 3D coordinates of each sensor based on the mesh network, wherein one of the sensors comprises a spring-mass sensor that uses relative motion between a mass and a coil to generate an analog output signal.

3. The wireless network of claim 2, wherein the sensors comprise geophones.

4. A wireless network, comprising:
   a plurality of sensors; and
   a wireless station adapted to communicate with the plurality of sensors, each wireless station having a positioning system to provide 3D coordinates, each wireless station being part of a mesh network providing node to node communication and each wireless station automatically determining the 3D coordinates of each sensor based on the mesh network, wherein the sensor comprises a wireless transmitter to transmit seismic data.

5. The wireless network of claim 4, comprising a smart antenna coupled to the wireless transmitter to transmit seismic data.

6. The wireless network of claim 4, comprising a multiple input multiple output (MIMO) antenna coupled to the wireless transmitter.

7. The wireless network of claim 2, wherein the sensor comprises a transmitter compatible with one of: 802 protocol, cellular protocol, Bluetooth protocol, Zigbee protocol.

8. The wireless network of claim 2, wherein the wireless station comprises a transmitter compatible with one of: 802 protocol, cellular protocol, Bluetooth protocol, Zigbee protocol.

9. The wireless network of claim 2, wherein the wireless station comprises a transmitter compatible with one of: WiFi protocol, WiMAX protocol, 3G cellular protocol, 4G cellular protocol.

10. The wireless network of claim 2, wherein the wireless station comprises a transmitter compatible with one of: 802.X protocol, cellular protocol, Bluetooth protocol, Zigbee protocol.

11. The wireless network of claim 2, comprising a smart antenna coupled to the wireless station.

12. The wireless network of claim 2, comprising a multiple input multiple output (MIMO) antenna coupled to the wireless station.

13. The wireless network of claim 2, comprising a WiMAX transceiver coupled to the wireless stations to transmit seismic data.

14. The wireless network of claim 13, comprising one of: a smart antenna, a multiple input multiple output (MIMO) antenna, each coupled to the WiMAX transceiver.

15. The wireless network of claim 2, comprising a truck having a transceiver to communicate with the wireless stations.

16. A wireless network, comprising:
   a plurality of sensors; and
   a wireless station adapted to communicate with the plurality of sensors, each wireless station having a positioning system to provide 3D coordinates, each wireless station being part of a mesh network providing node to node communication and each wireless station automatically determining the 3D coordinates of each sensor based on the mesh network, wherein each wireless station comprises a processor to pre-process and to remove noise from seismic data.

17. The wireless network of claim 2, comprising a fuel cell to power the wireless station.

18. The wireless network of claim 2, wherein the sensors communicate over the mesh network and self-assemble upon wireless station command.

19. The wireless network of claim 2, wherein time of arrival data is used to determine sensor location.

20. The wireless network of claim 2, comprising a multiple input multiple output (MIMO) antenna coupled to the wireless station and wherein the wireless station comprises a multi-cluster multi-hop wireless ad hoc network formed without pre-existing infrastructure.

* * * * *